United States Patent [19]
Mirtich

[11] Patent Number: 6,054,997
[45] Date of Patent: Apr. 25, 2000

[54] SYSTEM AND METHOD FOR DETERMINING DISTANCES BETWEEN POLYHEDRONS BY CLIPPING POLYHEDRON EDGE FEATURES AGAINST VORONOI REGIONS

[75] Inventor: Brian Mirtich, Arlington, Mass.

[73] Assignee: Mitsubishi Electric Information Technology Center America, Inc., Cambridge a

[21] Appl. No.: 08/921,162

[22] Filed: Aug. 29, 1997

[51] Int. Cl.[7] .................................................. G06T 17/00
[52] U.S. Cl. .......................... 345/433; 345/434; 345/419
[58] Field of Search .................................... 345/433, 434, 345/435, 419, 420

[56] References Cited

U.S. PATENT DOCUMENTS

| | | | |
|---|---|---|---|
| 4,933,889 | 6/1990 | Meshkat et al. | 364/578 |
| 4,958,305 | 9/1990 | Piazza | 364/522 |
| 5,051,737 | 9/1991 | Akeley et al. | 340/747 |
| 5,125,038 | 6/1992 | Meshkat et al. | 382/22 |
| 5,541,847 | 7/1996 | Tsonis et al. | 364/470.09 |
| 5,727,093 | 3/1998 | Uchiyama et al. | 382/294 |
| 5,798,764 | 8/1998 | Akiyama | 345/423 |
| 5,877,773 | 3/1999 | Rossin et al. | 345/434 |
| 5,943,056 | 8/1999 | Sato et al. | 345/419 |

OTHER PUBLICATIONS

Ponamgi et al.; "Incremental Algorithms for Collision Detection Between Polygonal Models"; *IEEE Transactions on Visualization and Computer Graphics*; vol. 3, No. 1, Jan. 1997; pp. 51–64.

*Primary Examiner*—Mark K. Zimmerman
*Assistant Examiner*—Albert K. Lee
*Attorney, Agent, or Firm*—Dirk Brinkman

[57] ABSTRACT

The present invention relates to a system and method for determining collisions between polyhedron objects represented by their features. Collisions are detected by determining the relative positions of closest features between pairs of polyhedra. The present invention is based upon comparisions of a feature from one polygon with a Voronoi region corresponding to a feature of another polyhedron. If a closest point from each feature is within the Voronoi region of the other feature, then the two features are the closest for that pair of objects. If the features are not within the Voronoi regions, then a new feature for one of the objects or polyhedra is selected based upon the position of the features relative to the Voronoi region. When a feature is of an edge type, the edge is clipped against the planes defining the Voronoi region. A new feature is selected based upon the relative positions of the points where the edge is clipped to the corresponding features defining the Voronoi region. In this manner, new features are selected which reduce the distance between features or which reduce the dimension of the selected feature without increasing the distance between features. New features are selected until the closests points are within the Voronoi region of the other feature, thus defining the closest features. The process is repeated for all pairs of objects and upon movement of any objects to continuously determine the closest features between sets of moving objects.

26 Claims, 13 Drawing Sheets

SYSTEM AND METHOD FOR DETERMINING DISTANCES BETWEEN POLYHEDRONS BY CLIPPING POLYHEDRON EDGE FEATURES AGAINST VORONOI REGIONS

FIELD OF THE INVENTION

The present invention relates to detection of collisions between moving objects represented in a computer. More particularly, it relates to determination of distances and collisions between polyhedral objects represented by primitive features.

BACKGROUND OF THE INVENTION

Many computer graphics based systems, such as computer games, virtual reality systems, animation, and simulation programs, represent objects independently moving. Such systems must determine the interaction between different objects, including when contact is made. For example, when two objects collide, the forces between the objects may define subsequent motion. Various procedures have been developed to determine the interactions.

Collision detection, a principal part of motion processing, is a central problem in many computer graphics applications. It is becoming more important with the rise of new applications in virtual reality, simulation, and physically based animation. For polyhedral models specified by a boundary representation, the algorithms fall into two main categories: feature-based and simplex-based. Both varieties use coherence to obtain sublinear performance when objects move continuously through space.

The features of a polyhedron are the vertices, edges, and faces forming its boundary. Feature-based algorithms perform geometric computations on these elements to determine if a pair of polyhedra are disjoint and possibly to compute the distance between them. One example is Baraff's algorithm, discussed in D. Baraff, "Curved Surfaces and Coherence For Non-Penetrating Rigid Body Simulation", Computer Graphics, pages 19–28 (Aug. 1990), which maintains a separating plane that embeds a face of one of the polyhedra, or one edge from each polyhedra. The polyhedra are disjoint if and only if such a separating plane can be found. The separating plane is cached from one invocation of the process to the next.

The Lin-Canny closest features algorithm, described in Ming C. Lin, "Efficient Collision Detection for Animation and Robotics," PhD Thesis, University of California, Berkeley, December 1993, is a more sophisticated feature-based algorithm that computes the distance between disjoint polyhedra. It has traditionally been considered among the fastest solutions for this problem, and is included in a software package known as I-Collide. The I-Collide collision detection package uses the Lin-Canny algorithm to perform the low-level collision checks. The algorithm tracks and caches the closest features between a pair of convex polyhedra. Once these features are known, the closest points between them, and therefore between the polyhedra, can be determined.

Lin-Canny has two principal drawbacks. The first is that it does not handle the case of penetrating polyhedra. If presented with such an instance, the termination criteria are never satisfied, and the algorithm will cycle forever. To prevent this, implementations of the Lin-Canny algorithm stop cycling when a maximum iteration count is reached. The iteration count is an arbitrary threshold not strictly related to the specific structures involved. Usually, it must be set by trial and error to achieve acceptable results. In order to be accurate, the iteration count must be sufficiently high to permit terminable calculations with many cycles. With a high iteration count, the process of determining an endless cycle is slow. The system also does not return any measure of penetration depth. Thus, the usefulness of the Lin-Canny method is limited in determining exact collision times by root-finding methods, and detecting collisions among non-convex polyhedra using standard hierarchical techniques. The second drawback is the lack of robustness of the Lin-Canny algorithm. Cycling behavior also occurs in geometrically degenerate situations, so cycle detection is not a guarantee of penetration. The algorithm can be adjusted through modification of various numerical tolerances which are interdependent in subtle ways. Choosing suitable values for all applications is difficult, if not impossible.

The difficulties in the Lin-Canny method are illustrated by the coding complexity. Much of a program implementing the Lin-Canny algorithm is devoted to correct handling of degenerate situations. Despite these problems, the relative speed of the Lin-Canny algorithm, and the general availability of the I-Collide package implementing the algorithm, have made it a popular choice for collision detection applications.

Simplex processes have other limitations. Rather than focusing on polyhedral features, simplex-based algorithms treat a polyhedron as the convex hull of a point set, and perform operations on simplices defined by subsets of these points. An algorithm (GJK) designed by Gilbert, Johnson and Keerthi and described in, "A Fast Procedure for Computing the Distance Between Complex Objects in Three-Dimensional Space," *IEEE Journal of Robotics and Automation*, pages 193–203, April 1988, was one of the earliest examples of this type. Given two polyhedra, the GJK algorithm searches for a simplex, defined by vertices of the Minkowski difference polyhedron, that either encloses or is nearest to the origin. If the origin is not enclosed, the distance between the origin and the nearest simplex of the difference polyhedron is equal to the distance between the original polyhedra. If the origin is enclosed, the polyhedra are penetrating, and a measure of the penetration is available.

The GJK algorithm is the essential core of an algorithm by Rich Rabbitz, discussed in "Fast Collision Detection of Moving Corvex Polyhedron", Graphic Gems IV (Heckbert, ed.), pages 133–109 (1991), which advances the original by making better use of coherence. Q-Collide is a collision detection library, spawned from I-Collide, which replaces the Lin-Canny algorithm with Rabbitz's algorithm for the low-level collision detection. All of Q-Collide's code and data structures to manage large numbers of objects are taken directly from I-Collide. Stephen Cameron has recently developed the fastest descendent of GJK, as discussed in "Enhancing GJK: Computing Minimum Penetration Distances Between Convex Polyhedra," *International Conference on Robotics and Automation, IEEE* (April 1997). This algorithm includes mechanisms to exploit coherence, and also uses topological vertex information to more carefully choose new simplices when the current simplices fail to satisfy the termination criteria. With these improvements, the algorithm attains the same almost-constant time complexity as Lin-Canny.

SUMMARY OF THE INVENTION

The present invention overcomes many of the deficiencies of existing methods for determining collision between polyhedra. According to an aspect of the invention, a closest-feature algorithm, utilizing Voronoi planes and regions, provides the bases for a system which determines the distance between polyhedra. The system determines the Voronoi regions corresponding to the features of the polyhedra. If the two closest points between two features from the two polyhedra are each within the other feature's Voronoi region, then those features are the closest features. By determining the two features which meet this criteria, the closest features are located.

According to another aspect of the invention, consideration of different features is based upon the current combination of features being compared and the closeness of the two features. Adjacent features are selected as closer, only if the dimension of one of the features is reduced without increasing the distance, or the distance strictly decreases for an increase in dimension. This prevents the system from cycling, like Lin-Canny, when features are equidistant.

According to another aspect of the invention, the relationship between an edge feature of a first polyhedron and the Voronoi region of a feature of a second polyhedron are determined through a clipping process. The clipping process identifies whether other features of the second polyhedron are closer to the edge feature of the first polyhedron. This information is used to select another feature for comparison as potentially closer.

According to another aspect of the invention, penetration of the polyhedra are determined using the clipping procedure. The clipping locations of an edge feature to the Voronoi region of a face of a corresponding polyhedron are compared, if they lie on opposite sides of the face, then there is penetration.

DETAILED DESCRIPTION

Figure 1:
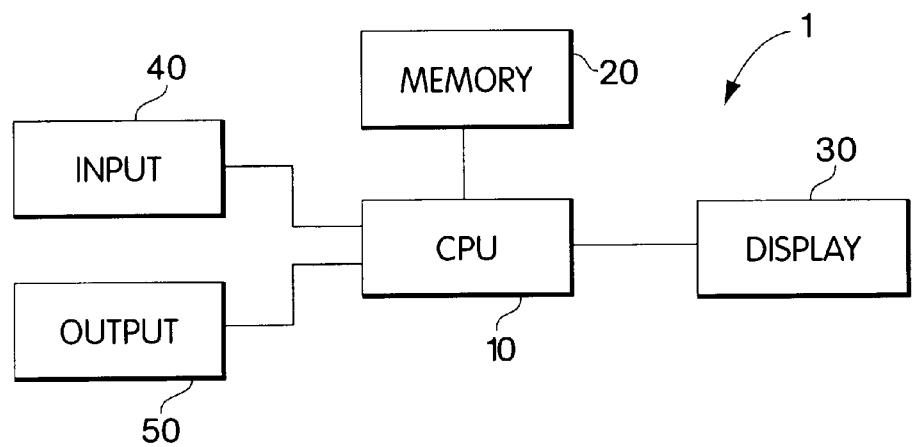
FIG. 1 illustrates a computer system which can be used in implementation of the present invention.

FIG. 1 represents a computer system 1 which can be used to implement the present invention. Of course, any type of computer or processor can be used which can store the necessary data and perform the functions on the data as discussed below. In FIG. 1, a central processing unit (CPU) 10 executes instructions stored in a memory 20, connected to the CPU 10. The memory also stores data to be processed. Such data includes representations of polyhedra, representations of Voronoi regions or spaces corresponding to features of the polyhedra, current states of comparisons, and closest features. According to one embodiment, the polyhedra are represented by features (edges, vertices, and faces). The instructions processed by the CPU 10 define how each object moves. Movement of objects can be based upon a variety of conditions, including inputs from a user during movement. The movement itself is not part of the present invention. Rather, the present invention is directed to determining relationships between moving objects at defined points in time. On the other hand, the relationship between the objects can be used in determining motion. For example, when objects collide, they can subsequently move away from each other at rates which depend upon their prior motions and how they collided.

Figure 2:
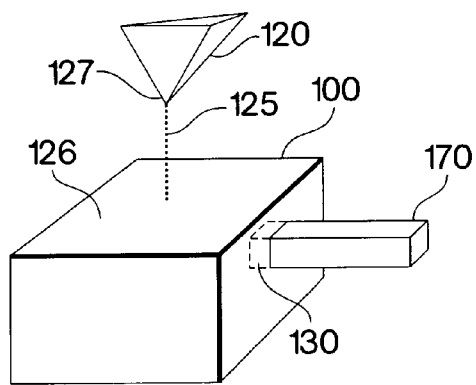
FIG. 2 illustrates polyhedra and the distance relationships between polyhedra.

A display 30 is also connected to the CPU 10 for representing data processed by the CPU. Any type of data may be represented on the display 30. For example, the objects and their motion may be represented. FIG. 2 illustrates examples of objects which can be processed and displayed. The objects 100, 120, 130 are represented as perspective views on a screen. The minimum distances can also be displayed as a line 125 between the closest features. If penetration is permitted by the movement processes, the penetrating objects 100, 110 can be represented as penetrating and the extent of penetration 130 can be represented. Additionally, the representation of objects which penetrate can be adjusted, such as by changing color, to represent the penetration.

Various inputs 40 and outputs 50 can be connected to the CPU 10 for exchanging information with the system. Thus, the relationship between objects can be outputted through the output 50 to be used by other machines or processes. The input 40 can be used to provide data about objects. Alternatively, motion of the objects can be determined externally to the system 1. The motion is provided through input 40, and the relationship between the objects, as determined by the system is outputted through output 50.

The processes of the present invention are best understood in relation to theories applying to the representation of objects. Of course, the invention can be modified by those of skill in the art to other object representations. According to one representation, the boundary of a convex polyhedron in $R^3$ contains vertices, edges, and faces. These features are convex sets. Polyhedral edges are represented as vectors from a tail point to a head point. A point along an edge may be parameterized by a scalar valued between 0 and 1, representing the unitized distance between the tail and head.

Neighboring features are those which abut or are adjacent to a feature. The neighbor relation is symmetric. The neighbors of a vertex are the edges incident to that vertex. The neighbors of a face are the edges bounding the face. An edge has exactly four neighbors: the two vertices at its endpoints and the two faces it bounds. Polyhedral features are treated as closed sets. Hence, a face includes the edges that bound it, and an edge includes its vertex endpoints.

Figure 3A:
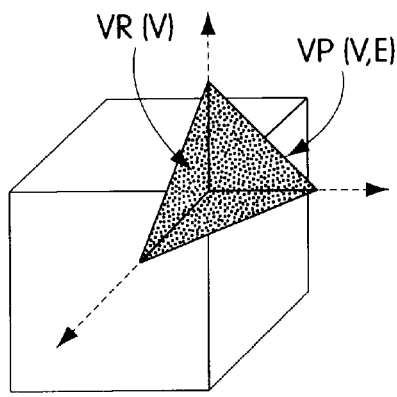
FIGS. 3a–3b illustrate the Voronoi regions for different features.
Figure 3B:
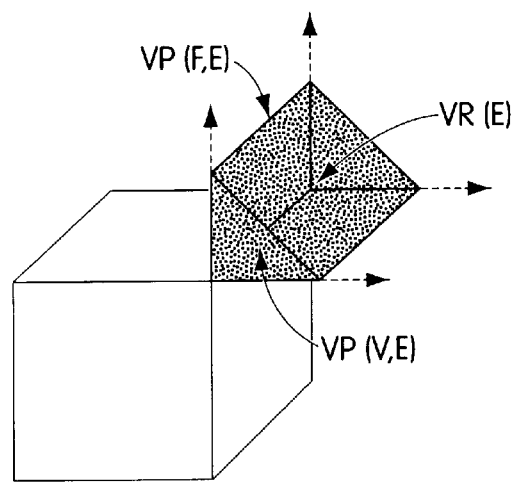
Figure 3C:
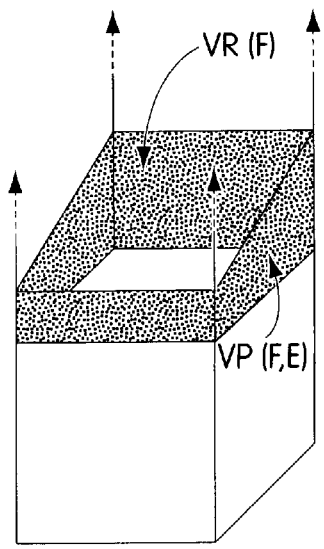

Voronoi regions and planes are central to the operation of the present invention. For a feature on a convex polyhedron, the Voronoi region is the set of points outside the polyhedron that are as close to the feature as to any other feature on the polyhedron. The Voronoi plane between neighboring features X and Y is the plane containing the Voronoi region of X and the Voronoi region of Y. All Voronoi regions are bounded by Voronoi planes, and the regions for all features of an object collectively cover the entire space outside the polyhedron. Voronoi planes between neighboring features come in two varieties: vertex-edge and face-edge planes. Vertex-edge planes contain the vertex and are normal to the edge, while face-edge planes contain the edge and are parallel to the face normal. The Voronoi region of a vertex V is bounded by a homogeneous set of planes: each is a vertex-edge plane between V and one of its neighboring edges. The Voronoi region of an edge E is bounded by four planes: two vertex-edge planes and two face-edge planes. The Voronoi region of an s-sided face F is bounded by s+1 planes: a face-edge plane for each edge bounding F, plus the support plane of F itself; VR(F) is a semi-infinite polygonal prism. FIGS. 3(a)–3(c) respectively represent the Voronoi regions for a vertex, edge and face of a cubic object.

The present invention is based on a fundamental theorem relating to Voronoi regions. If X and Y are a pair of features from disjoint convex polyhedra, and x and y are the closest points between X and Y, If x is in the Voronoi region of Y and y is in the Voronoi region of X, then x and y are a globally closest pair of points between the polyhedra. This theorem does not require the closest points on x and y to be unique, and in degenerate situations they are not. If the conditions of the theorem are met, however, no pair of points from the two polyhedra are any closer than x and y. Like the Lin-Canny algorithm, the present invention searches for two features that satisfy the conditions of the basic theorem. At each iteration, the invention tests whether the current pair of features satisfy the conditions, and if not, updates one of the features, usually to a neighboring one. In updating to a new feature which is of higher dimension than the old one, then the inter-feature distance must strictly decrease. If the new feature is of lower dimension than the old one, the distance will remain unchanged since the old feature includes the new one and thus the new one cannot be closer. However, such an update does improve the localization of the closest point, and may trigger subsequent updates that strictly reduce the inter-feature distance. In contrast to the Lin-Canny algorithm, the present invention never actually computes the closest point on the features. This is what gives the algorithm its robustness in the face of degeneracy. Furthermore, the present invention does not depend on the polyhedra being disjoint, and it correctly converges to a suitable pair of features when there is penetration.

Figure 4:
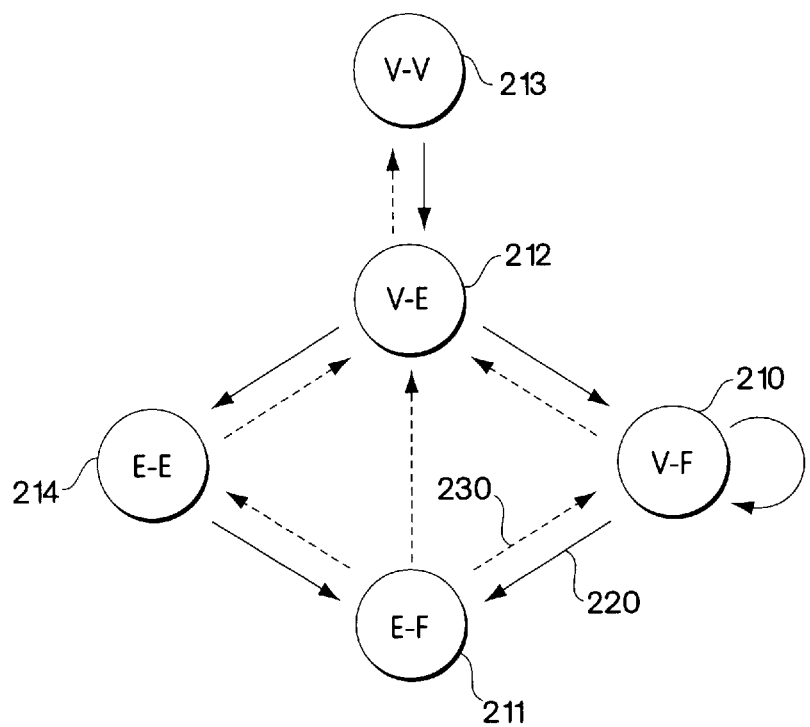
FIG. 4 illustrates movement between comparison states in finding the closest features according to the present invention.

The state diagram of FIG. 4 illustrates operation of the algorithm to determine closest features based upon any selected features. Each state 210–214 corresponds to a possible combination of feature types, one from each polyhedron being compared. For example, the V-F 210 state means one feature is a vertex, and the other is a face. The arrows 220,230 denote possible update steps from one state to another. Solid arrows 220 mark updates that decrease the inter-feature distance; dashed arrows 230 mark updates for which the inter-feature distance stays the same. The four primary states of the algorithm are V-V, V-E, E-E, and V-F; it may terminate in any one of these states. The fifth state 211, E-F, is special in that the algorithm cannot terminate in this state unless the polyhedra are penetrating. Unlike prior art algorithms, the algorithm of the present invention must terminate. As illustrated in FIG. 4, there are no cycles comprising only dashed arrows. Any infinite path through the graph would contain an infinite number of solid arrows, each denoting a strict reduction in the inter-feature distance. Since there are only a finite number of feature pairs, infinite reduction in distance is impossible.

Figure 5:
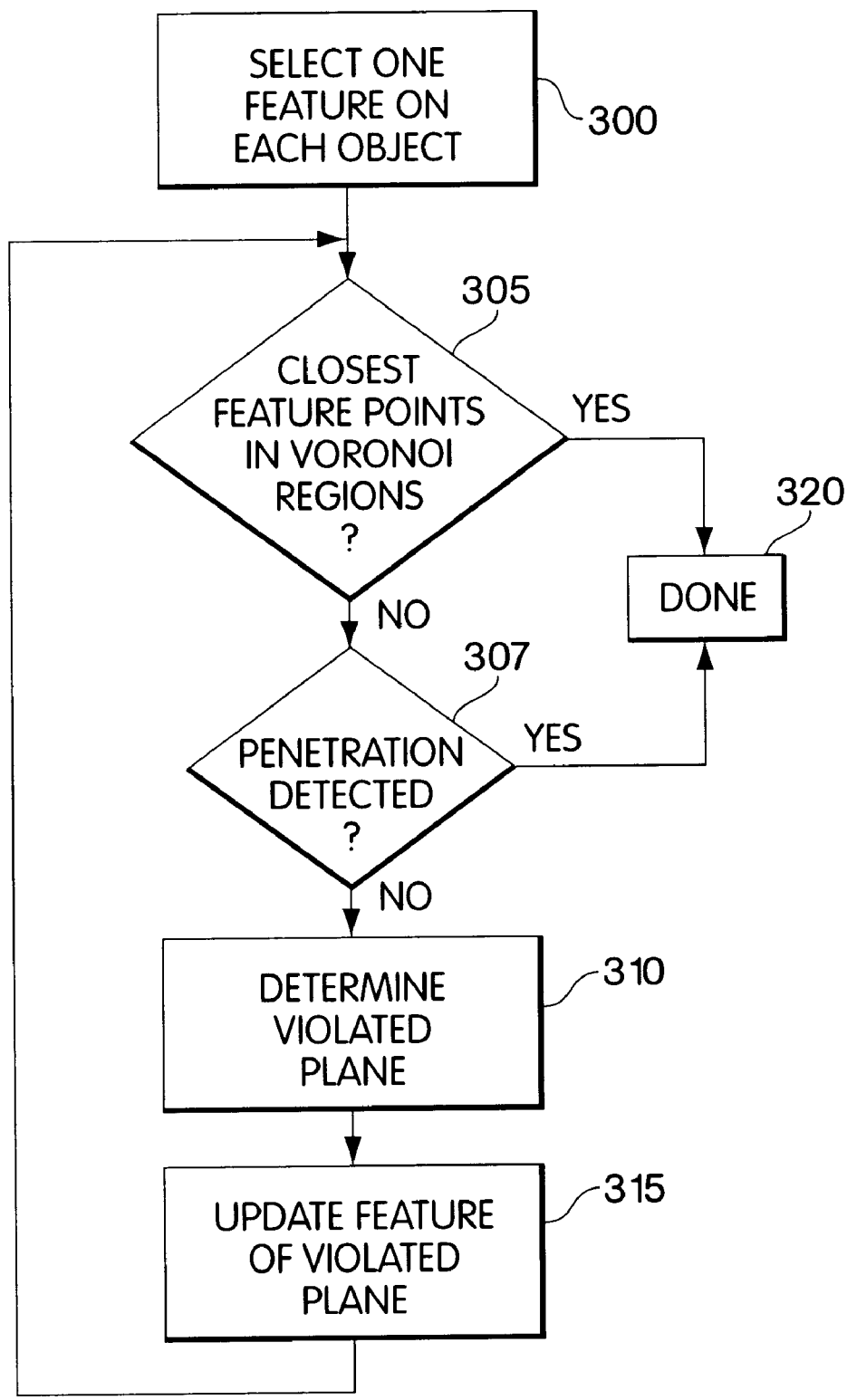
FIG. 5 is a flow chart of operation of the present invention.

FIG. 5 illustrates the general process performed in determining the closest features of two polyhedra. First, at step 300, two features are selected. Initially, the features may be randomly selected. In subsequent iterations, the closest features from the prior iteration may be used as the initially compared features. At step 305, tests are executed to determine if each closest point between the two features lies within the Voronoi region of the feature from the other polyhedron. If both points are within the corresponding regions, then the theorem is met and the current features are the closest features. The process then terminates at step 320. Of course, the closest features may be outputted in a manner which can be utilized by the system, such as for display. If the points are not both within the other feature's Voronoi region, then one of the features needs to be updated with a new feature from the same polyhedra. First, at step 307, the system checks whether the features are penetrating. If not, step 310, the system determines which Voronoi plane has been violated, i.e., which direction the point is relative to the Voronoi region. At step 315, the feature corresponding to the violated Voronoi plane is selected as a new feature for comparison. The process then returns to step 305. The process loops until the closest features are found.

The actual processing of steps 305, 310 and 315 depends upon the types of features which are being compared. As noted in FIG. 4, there are five possible states 210–214 which relate to different comparisons. FIGS. 6A–6E correspond to the actual processing steps for each of these states. The function in each of these states return one of three values: DONE means the conditions of the theorem are satisfied, and correspond to a true response in step 305; PENETRATION means that penetration witnesses have been found; and CONTINUE means that the conditions of the theorem are not met, one of the features has been updated, and the process should continue.

Figure 6A:
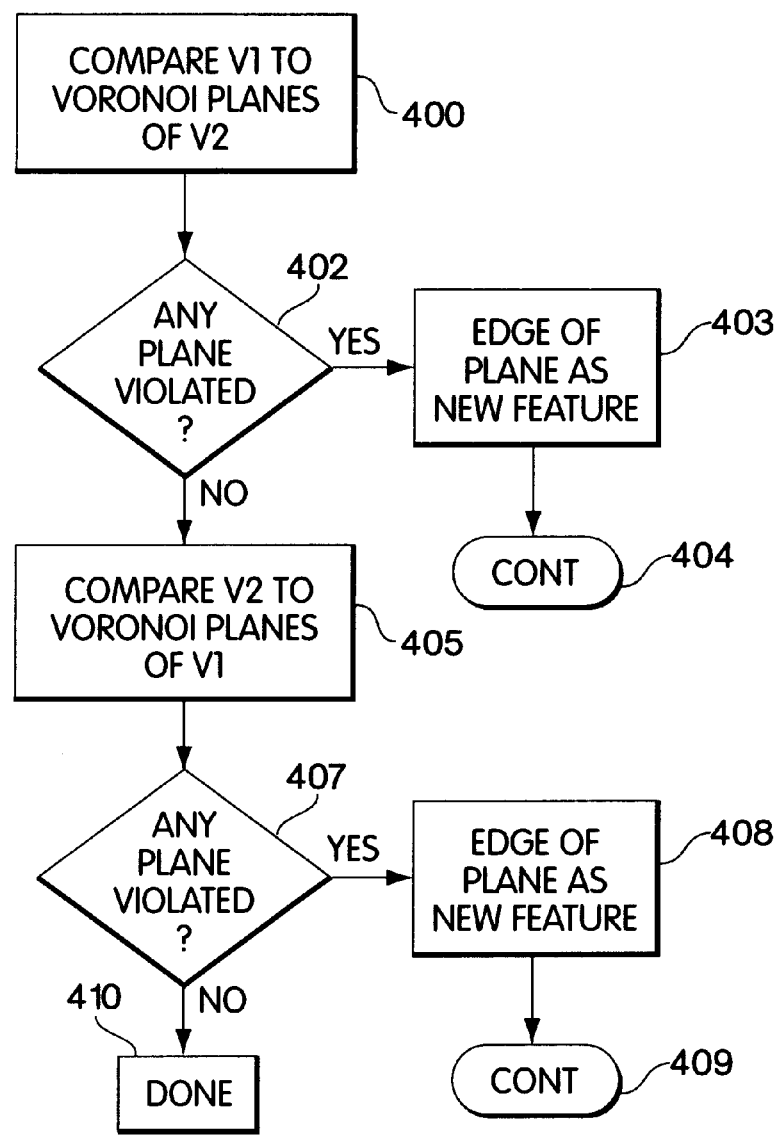
FIGS. 6A–6E illustrate operation of the present invention in accordance with different comparison states.

FIG. 6A corresponds to the vertex-vertex state 213. At step 400, one of the vertices V1 is compared with the Voronoi region of the other vertex V2. A vertex feature contains only a single point, which is easily tested for membership in the other feature's Voronoi region. If V1 is outside a plane of the Voronoi region corresponding to one of the neighbor edges E of V2, then V1 is strictly closer to E than to V2, i.e. a plane has been violated at step 402. In this case, E is selected as the new feature (step 403) and the main process continues (step 404). If V1 is within the Voronoi region of V2, then V2 is compared to the Voronoi region of V1. In a similar manner, if V2 lies outside one of the Voronoi planes of V1, then the neighbor edge E is selected as the new feature (step 409). If neither vertex is updated to an edge, the V1 and V2 lie inside each others Voronoi regions, and the process is DONE (step 410).

Figure 6B:
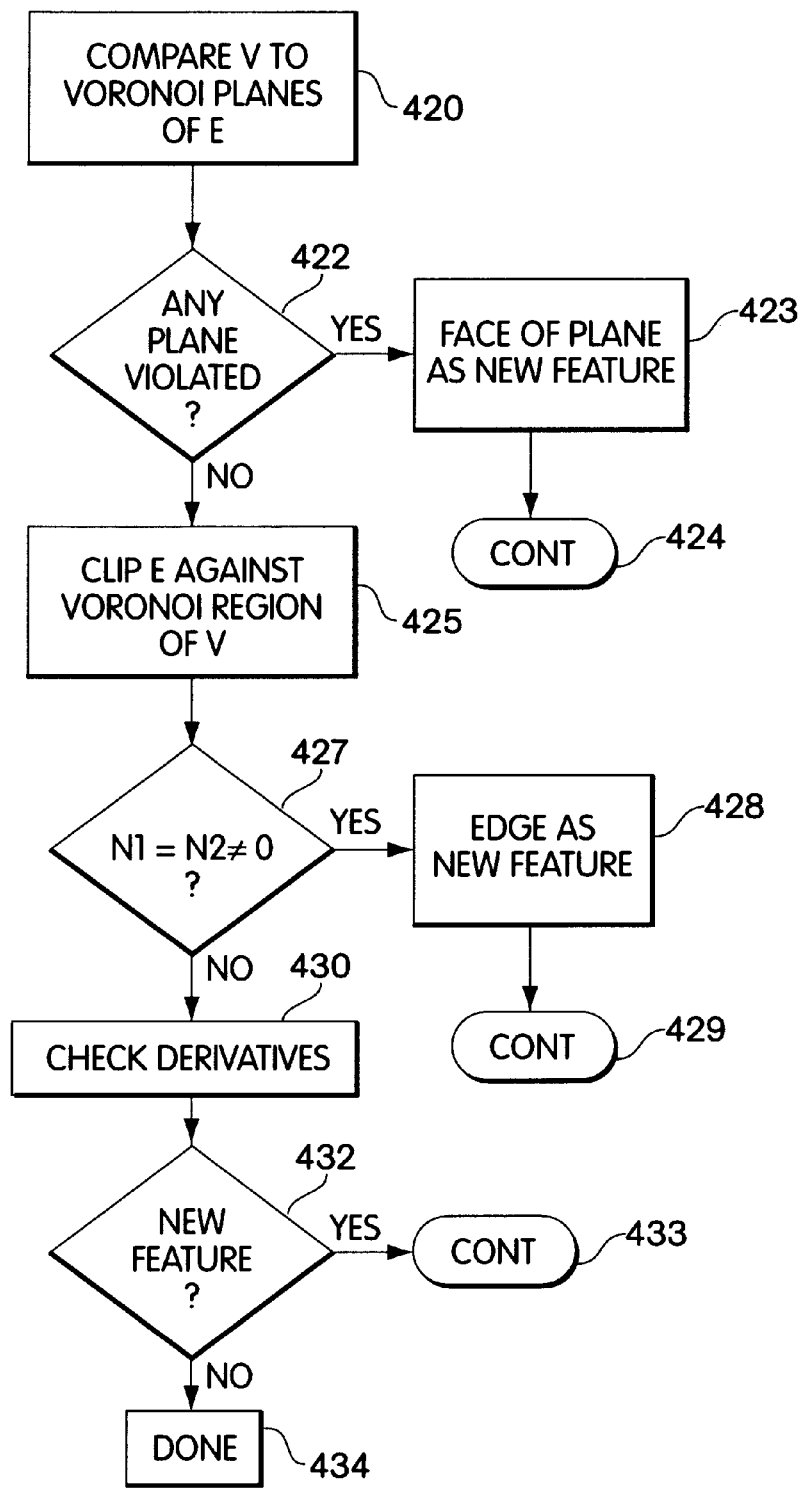

FIG. 6B illustrates the process for the vertex-edge state 212. As discussed above, determining whether a vertex is in a Voronoi region is simple. The vertex is compared with each of the Voronoi planes of the edge. If any of the planes are violated, the E is updated to a new feature, either a vertex or a face, which corresponds to the violated plane (step 423), and the processing continues in the new state (step 424). If the vertex is within the Voronoi region of the edge, then the edge is compared to the Voronoi region of the vertex. Comparisons of edges and faces to Voronoi regions are more difficult than for vertices. To determine whether any of the planes have been violated, the edge is clipped against the planes. The clipping process is illustrated in FIGS. 7 and 8 and discussed in detail below.

Figure 7:
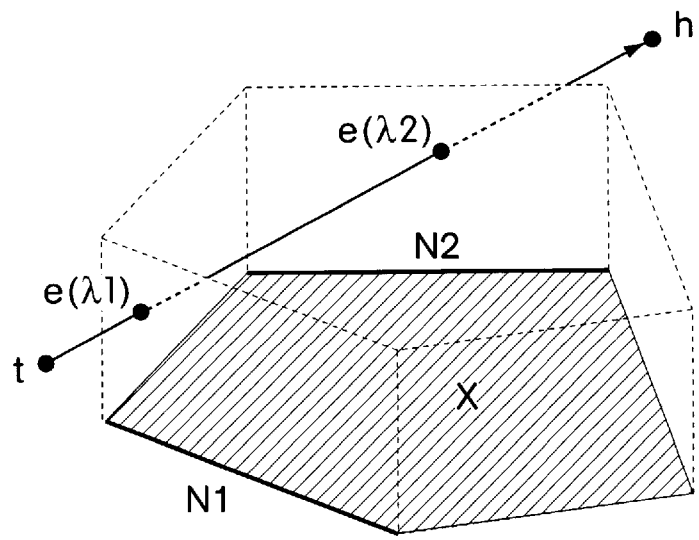
FIG. 7 illustrates clipping of edges according to the present invention.
Figure 8:
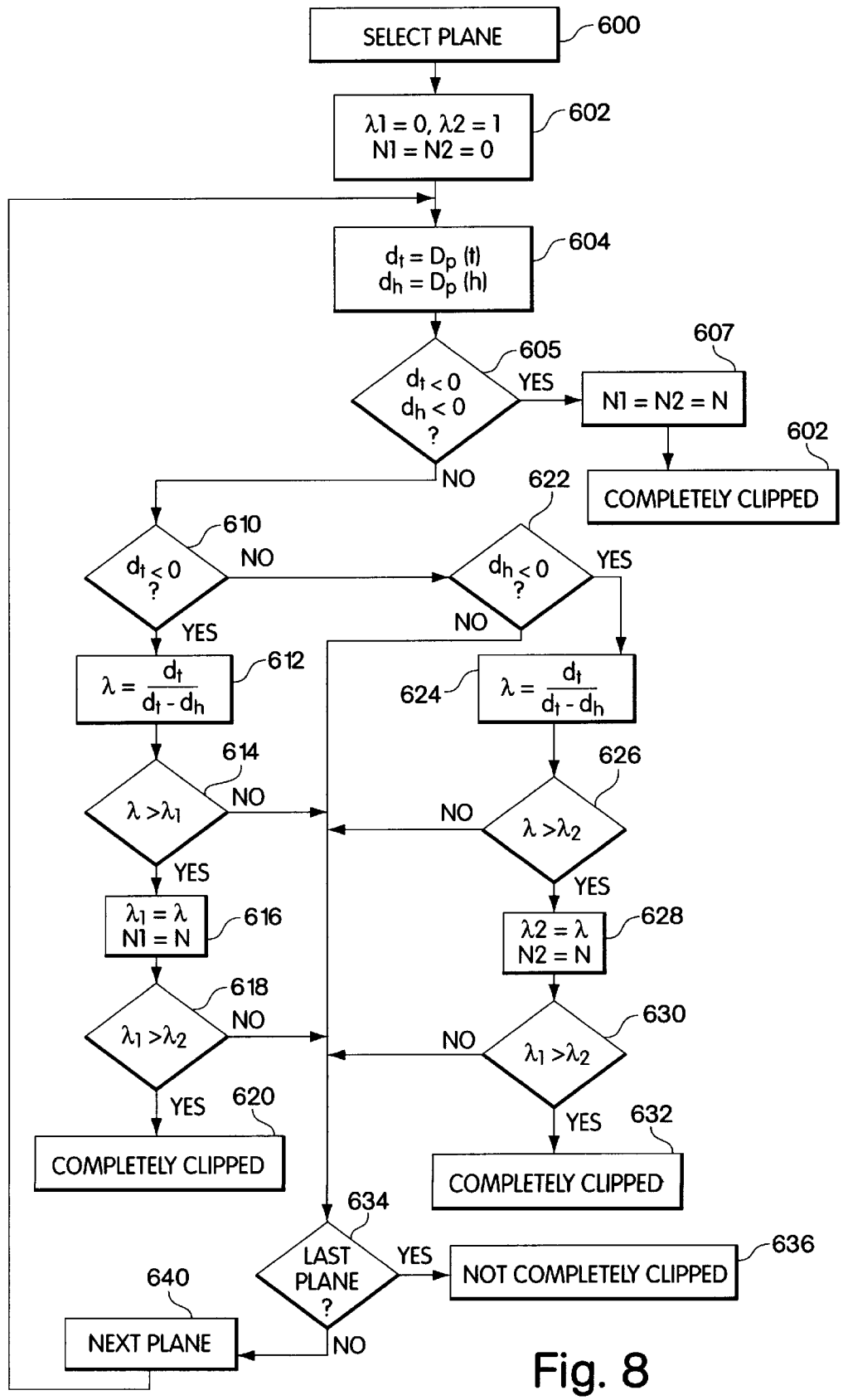
FIG. 8 is a flow chart of operation of the present invention for clipping.

FIG. 7 depicts clipping of an edge against a Voronoi region of a face. The clipping process determines where the edge enters and leaves the Voronoi region. Since the edge is directional, it has a tail t and a head h. Any point on the edge can be represented by a value λ between 0 and 1. The edge is then represented by a parametric equation e(λ). The clipping process determines the values of λ, where the edge passes into the Voronoi region λ1 and out of the Voronoi region λ2. The neighbor features N1, N2 corresponding to the Voronoi planes which are intersected are also determined by the process.

At step 427 (FIG. 6B), the neighbor features are compared. If the edge lies entirely outside one Voronoi plane of the vertex, i.e. N1=N2≠0, then the edge corresponding to that plane becomes the new feature in place of the vertex (step 428). If the edge crosses a Voronoi plane as it enters and/or leaves the vertex's Voronoi region, i.e. N1≠N2, then the values of the derivative of a distance function representing the distance between the edge and the vertex are compared for λ1 and λ2 at step 430. If the derivative at λ1 is positive, then N1 is the new feature. Otherwise, if the derivative at λ2 is negative, then N2 is the new feature. Of course, this assumes that N1 and N2 are not null. If a new feature has been selected in checking the derivatives, then the process continues (step 433). Otherwise, the process ends at step 444 because the closest point on the edge is within the Voronoi region of the vertex.

Figure 6C:
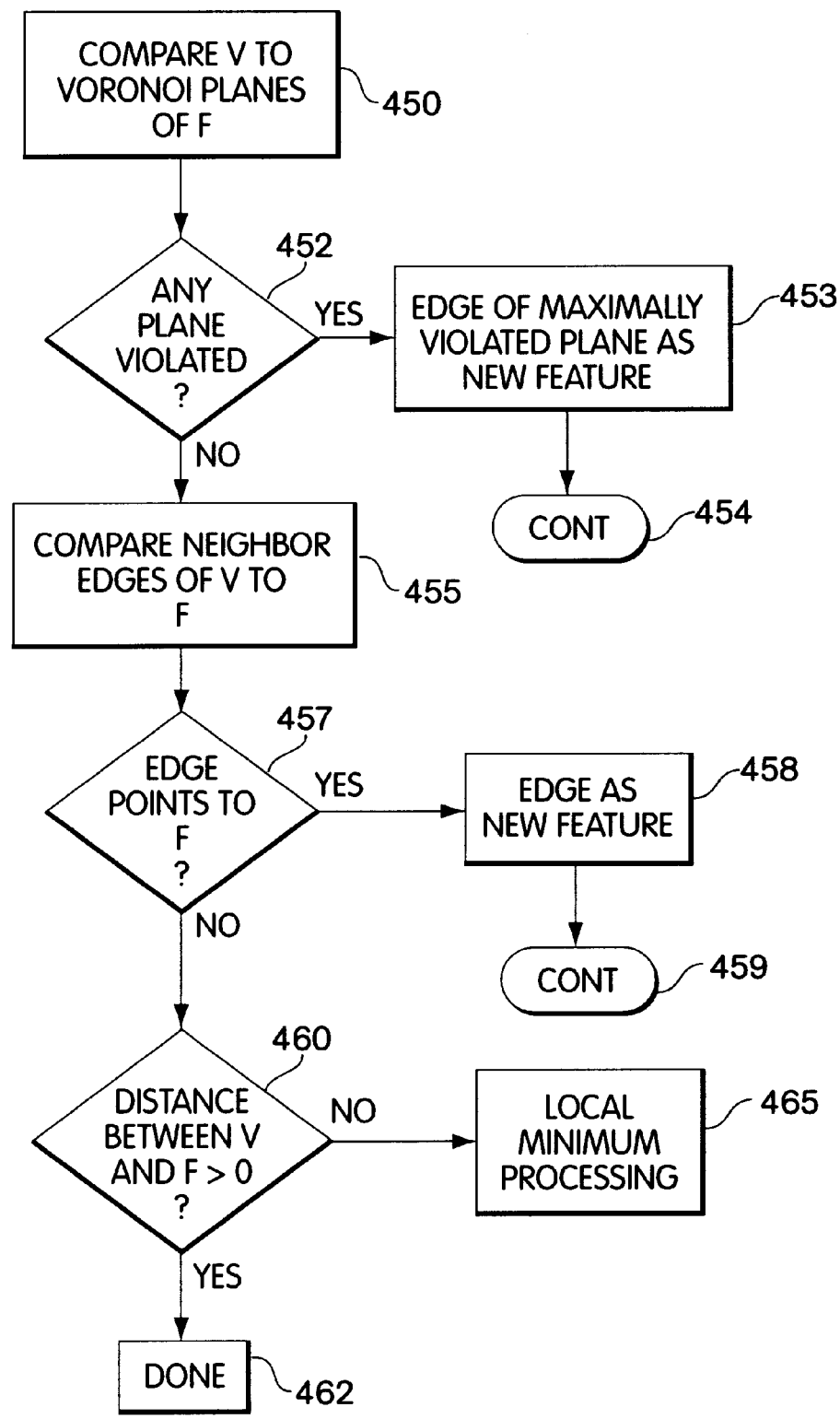

FIG. 6C illustrates processing in the vertex-face state 210. First, the vertex is compared with the Voronoi planes of the face. However, when testing V against the Voronoi region of F, the algorithm does not stop at the first Voronoi plane which is violated, but searches for the maximally violated plane. This avoids a situation where the vertex is on an opposing side of an edge from the face, but is closer to a different edge or part of the face. Thus, when F is updated, the inter-feature distance does not increase. If the vertex is within the Voronoi region of the face, then the face must be compared with the Voronoi region of the vertex. This can be done by comparing the neighbor edges of the vertex to the face. The search in step 455 is for an edge incident to V that points toward F. It is equivalent to checking if the closest point on F to V lies within the Voronoi region of the vertex. If an edge is found which points to the face, that edge becomes the new feature (step 458). If there is no such edge, the distance between the vertex and the face is checked at step 460. If this distance is positive, then the closest features have been found (step 462). However, if the distance is zero or negative, the polyhedra may be penetrating or a local minimum may be present. The process for determining penetration and local minima is discussed below.

Figure 6D:
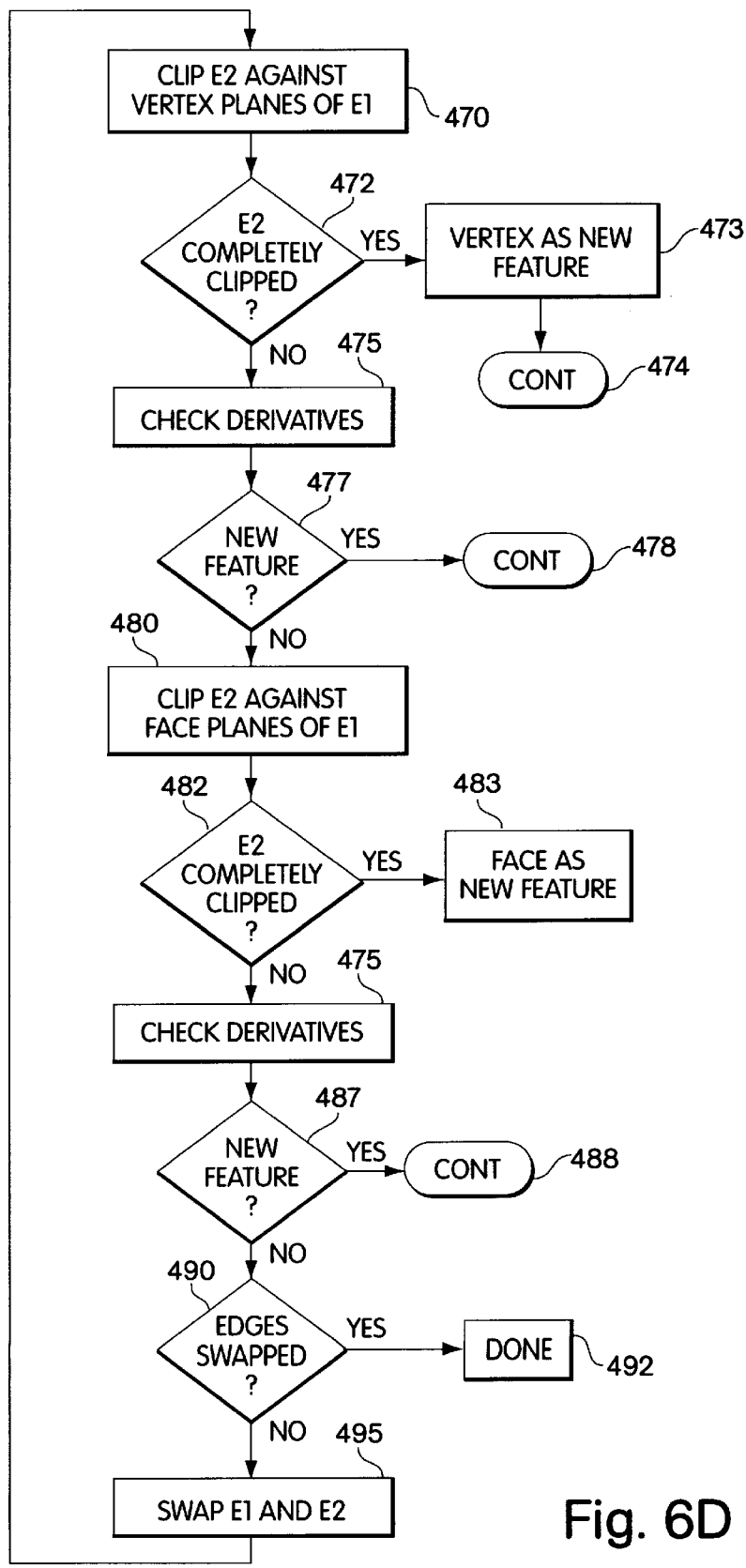

FIG. 6D illustrates the process for the edge-edge state 214. It is important to handle the two vertex-edge Voronoi planes first. Thus, step 470 clips one of the edges E2 with the vertex Voronoi planes of the other edge E1. If E2 is completely clipped, i.e., it is entirely outside the Voronoi region, then the corresponding vertex of the violated plane is the new feature in place of E1 (step 473). Otherwise, the derivatives of the distance function must be checked at the clipped points. As discussed above, if the derivative at λ1 is positive or the derivative at λ2 is negative, then the corresponding vertex becomes the new feature, and the process continues (step 478) Next, at step 480, E2 is clipped against the face Voronoi planes of E1. Again, if E2 is completely clipped by any of the planes, the corresponding face is the new feature (step 483). Otherwise, the derivatives of the crossing points are again checked. If a new feature has not been selected in comparing E2 to the Voronoi region of E1, then the edges are exchanged (step 495) to compare E1 to the Voronoi region of E2. If, after this comparison, no new feature occurs (step 490), then the closest features have been found and the process ends (step 492).

Figure 6E:
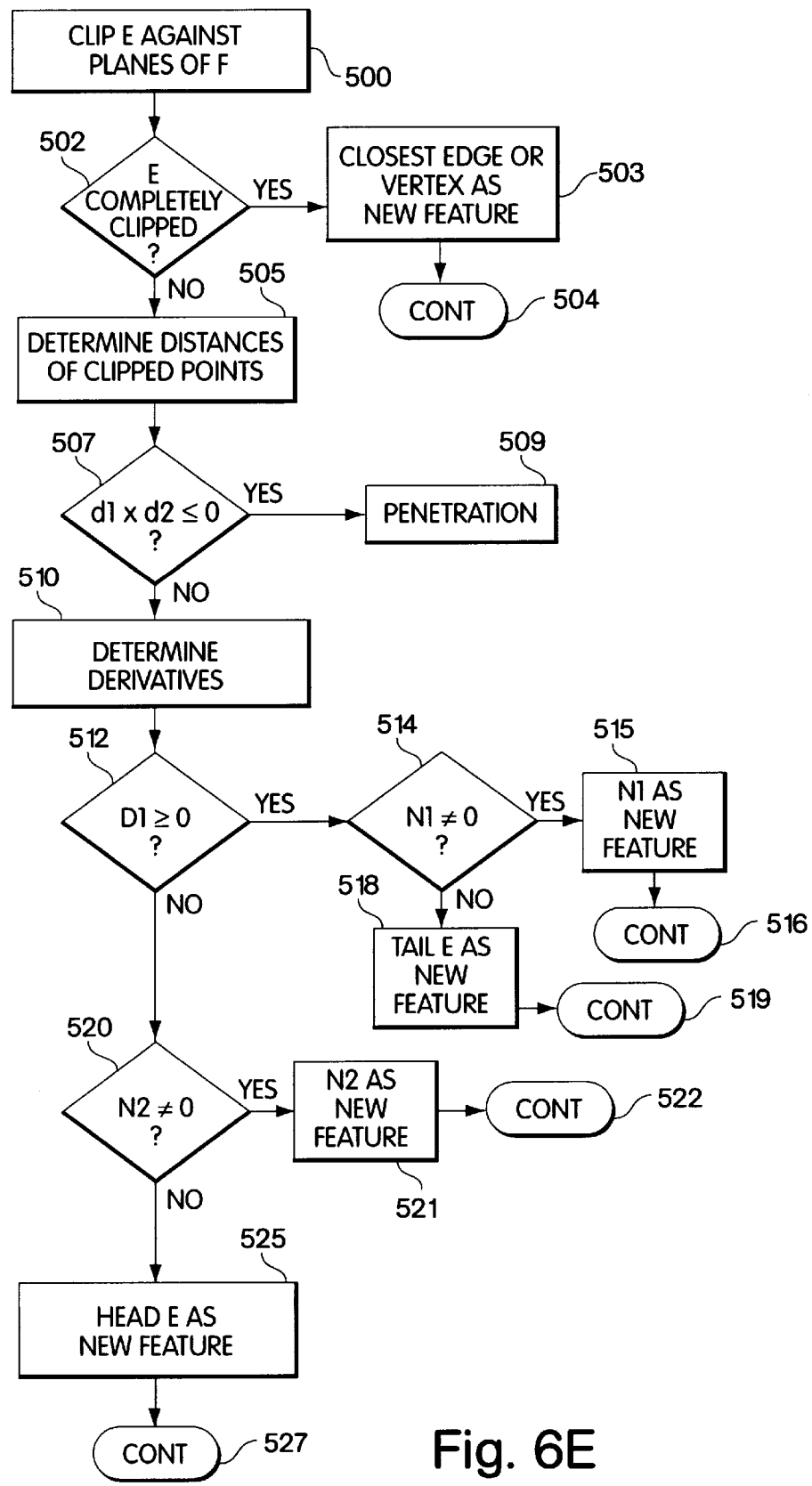

Finally, FIG. 6E illustrates the process for the edge-face state 211. As noted above, the process cannot terminate in this state. The process either determines that the polyhedra are penetrating, or updates one of the features to a lower dimensional neighbor without changing the inter-feature distance. First, at step 500, the edge is clipped against the Voronoi planes of the face. If E is completely clipped and lies entirely outside the Voronoi region of the face, then the closest neighboring edge or vertex of the face to the edge E becomes the new feature (step 503). If E intersects the region, the distances D1, D2 from the crossing points on E to the plane of F are computed. If these distances are not both positive or both negative (step 507), then the edge E pierces F and PENETRATION is returned. Otherwise, either F is updated to one of its boundary edges or E is updated to one of its endpoints in a way which does not change the inter-feature distance. Updating of the features is based upon the derivatives d1, d2 and corresponding neighbor features N1, N2 of the crossing points λ1, λ2 as determined by the clipping process. If D1 is non-negative (step 512), and N1 is not null (step 514), then N1 is the new feature for the face (step 515). If D1 is non-negative, but N1 is null, then the tail vertex of the edge is the new feature (step 518). If D1 is negative and N2 is not null (step 520), then N2 is the new feature for the face (step 521). If D1 is negative and N2 is null, then the head vertex of the edge is the new feature (step 525).

As noted above, a principal part of the invention is the use of clipping of edges against Voronoi regions. FIG. 7 depicts clipping of an edge against a Voronoi region of a face. The clipping process determines where the edge enters and leaves the Voronoi region. Since the edge is directional, it has a tail t and a head h. Any point on the edge can be represented by a value λ between 0 and 1. The edge is then represented by a parametric equation e(λ). The clipping process determines the values of λ, where the edge passes into the Voronoi region λ1 and out of the Voronoi region λ2. The process is illustrated in FIG. 8.

S is a subset of the set of oriented planes bounding the Voronoi region of X. Each plane in S imposes a linear inequality constraint that points in the region must satisfy. Collectively, the planes in S define a convex region K. If E is an edge, then the intersection of E and the region K is either empty, or a line segment along E from λ1 to λ2. Also, if the intersection is not empty, the neighboring features N1, N2 of X correspond to the planes that clip E. E enters K as it crosses the Voronoi plane of N1, and exits as it crosses the Voronoi plane of N2.

In step 600, one of the Voronoi planes P is selected. Since all of the planes are processed, the initially selected plane does not matter. At step 602, initial parameters are set. λ1 and λ2 are respectively set to 0 and 1, corresponding to the tail and head of the edge. N1 and N2 are both set to zero, indicating no corresponding neighbor or crossed plane. At step 604, the distances from the head and tail of the edge to the selected plane are determined. If both distances dt, dh are negative (step 605), then both N1 and N2 are set to the neighbor of the selected plane (step 607), and the edge is considered completely clipped (step 608) because it is completely outside the Voronoi region. If dt is negative (and dh is positive), then steps 612–620 are performed. On the other hand, if dh is negative (and dt is positive), then steps 624–632 are performed. The sets of steps are similar. First, a parameter λ is determined based upon dt and dh (steps 612, 624). The divisions that occur in these steps are the only divisions that occur in the entire process. In these cases, the divisor's magnitude must be nonzero and never less than the dividend's magnitude, thus no overflow can occur. If λ is greater than λ1 (step 614), then, at step 616, λ1 is reset to λ and N1 is set to the neighbor feature of the selected plane N. λ1 is compared to λ2 at step 618. If λ1 exceeds λ2, then the crossing points are outside the Voronoi region, and the edge is completely clipped (step 620).

Similarly, in step 624, λ is compared with λ2. If it is less than λ2, then λ2 becomes λ and N2 becomes N. Again, if λ1 is greater than λ2 (step 630), then the edge is completely clipped by the region (step 632).

After processing a plane, then another plane is selected at step 640. The process is repeated until all of the planes have been considered. Once all of the planes have been considered, the edge is considered not completely clipped at step 636, which means that at least a portion of the edge lies within the Voronoi region. The final values of λ1, λ2, N1 and N2 correspond to the crossing points and neighbors of the crossed planes. These values are then used, as discussed above, to determine new features to be considered.

If the edge is not completely clipped, then certain information can be determined about the relationship between the edge and the feature of the other polyhedron. In particular, the derivatives of the distance between the edge and the other feature are needed to determine the proper new feature, as discussed above. However, in practice, only the sign of the derivative at certain points must be determined. The signs can be easily determined without calculating the exact derivative. The edge distance function, which is the distance between e(λ) and X, is defined as $$D_{E,X}(\lambda) = \min_{x \in X} \|x - e(\lambda)\|$$

The edge distance function is continuous and convex. Also, If $e(\lambda_0)$ is not part of X, then the function is differentiable at: $\lambda_0$. In determining which neighboring features to select, the question is whether the minimum value of the edge distance function is in the clipped portion of the edge. This question is answered simply by checking the signs of its derivative at λ1 and λ2. The minimum occurs in the interval [0,λ1] if and only if D'(λ1)>0; it occurs in the interval [λ2,1] if and only if D'(λ2)<0. This is the basis for the derivative checking steps 430 (FIG. 6B), 475, 485 (FIG. 6D), and 510 (FIG. 6E). If X is updated to a neighboring feature, then the inter-feature distance stays the same if the neighboring feature is of lower dimension than X, and strictly decreases if the neighboring feature is of higher dimension than X. If X is not updated, than the closest point on E to X lies within K. The formulas for evaluating the signs of the edge distance function follow from basic geometry. Let u be a vector directed along E, from tail to head. If X is a vertex at position v, then sign[D(λ)]=sign[u·(e(λ)–v)]. Similarly, if X is a face in the plane P with outward normal n, then $$\text{sign}[D_{E,X}(\lambda)] = \begin{cases} +\text{sign}(u * n), & D_p[e(\lambda)] > 0 \\ -\text{sign}(u * n), & D_p[e(\lambda)] < 0 \end{cases}$$

A formula for the case where X is an edge is unnecessary. In this case, the derivative can be evaluated with respect to the relevant neighboring feature, which must be a vertex or face. The derivative with respect to this neighboring feature is equal to the derivative with respect to X at the point where E crosses the Voronoi plane.

The derivative equations can be invalid in certain degenerate situations in which the distance function is not differentiable at e(λ). In these cases, however, the algorithm can simply report penetration since the edge E intersects the other feature.

If the edge is completely clipped, the features may still be updated. There are two ways that E lies completely outside the Voronoi region. The first, termed simple exclusion is detected when both endpoints of E are found to lie on the "outside" of a single Voronoi plane. The second, termed compound exclusion, is detected when λ1 exceeds λ2; this means that no point on E simultaneously satisfies the constraints imposed by two Voronoi planes. The two cases are distinguished by whether or not N1=N2. In either case, X must be updated. Some care is required because of a subtle difference between vertex-edge and face-edge Voronoi planes. A vertex-edge Voronoi plane defines two half-spaces: points in one half-space are strictly closer to the edge while points in the other are equidistant from the edge and the vertex. A face-edge Voronoi plane does not partition space in this way. Points on either side of the Voronoi plane may be strictly closer to the face than to the edge. A consequence of these facts is that the derivative check processes are valid wherever an edge crosses a vertex-edge Voronoi plane, even if the crossing is not on the boundary between the corresponding Voronoi regions. In contrast, if an edge crosses a face-edge Voronoi plane, the derivative checks and update steps are valid only if the crossing occurs on the boundary between the Voronoi regions.

If E lies completely outside a vertex V's Voronoi region, the update is straightforward. For simple exclusion, the entire edge E lies on the edge side of a vertex-edge Voronoi plane. Every point on E is strictly closer to the neighboring edge than to V, and so V is updated to this edge. For compound exclusion, since both plane crossings are with vertex-edge Voronoi planes, the derivative checking process is used.

Penetrating polyhedra are a special case, as identified above. Because of the criteria the present invention uses to update features, handling penetrating polyhedra can be done efficiently and with little extra effort. When an edge is clipped against a face, the crossing points on the edge are tested for sidedness relative to the plane of F. If they lie on opposite sides, then E must pierce F and the algorithm terminates with these two features as witnesses to penetration.

Figure 9:
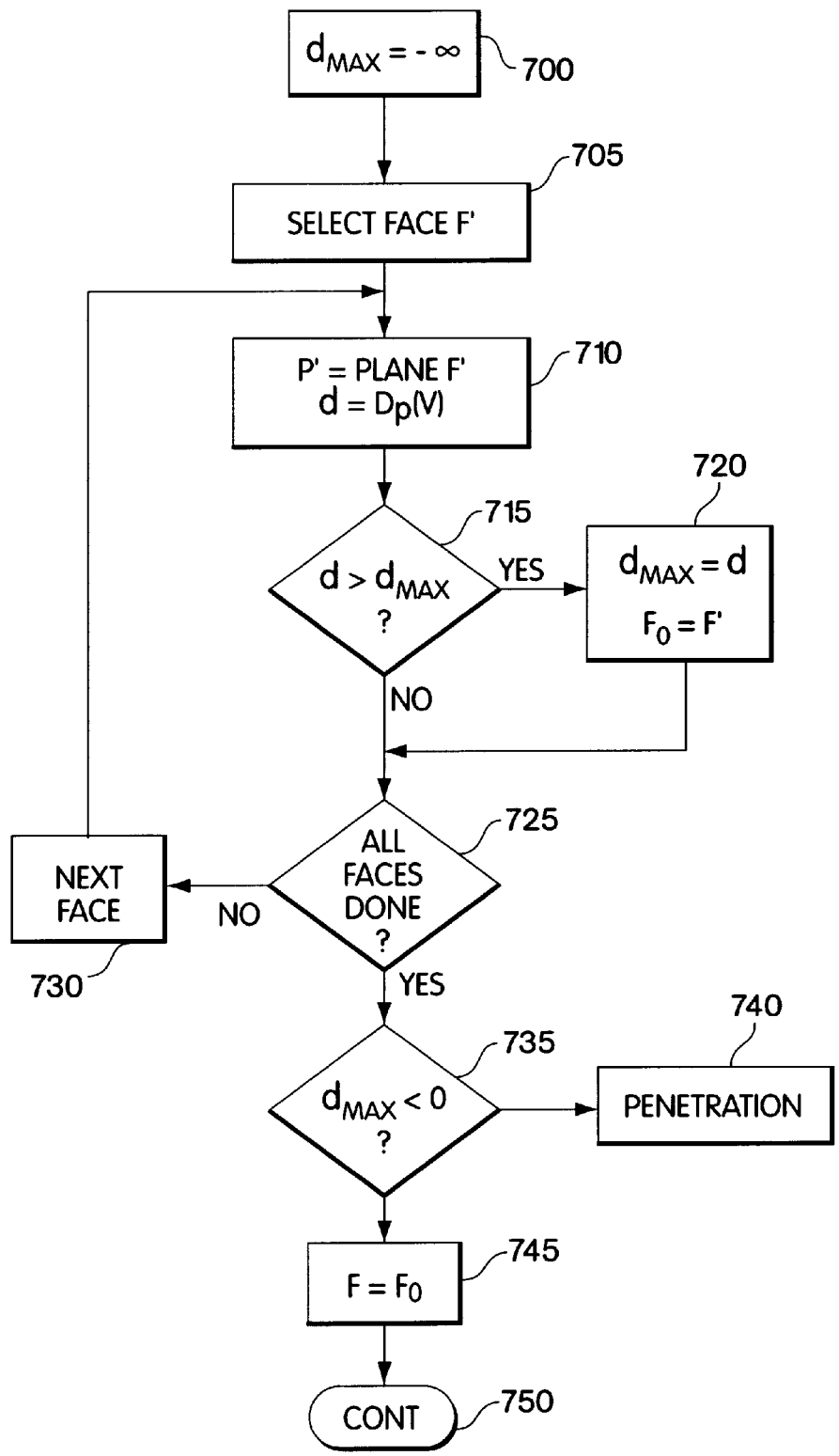
FIG. 9 is a flow chart of operation of the present invention for escaping local minima.
Figure 10A:
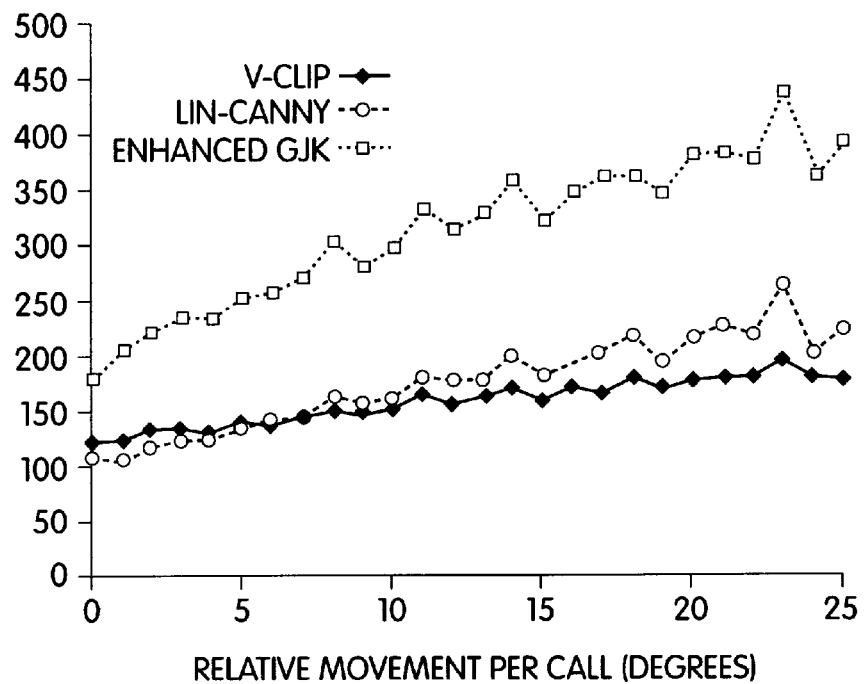
FIGS. 10a–10d represent relative operational performance of the present invention with respect to other algorithms.
Figure 10B:
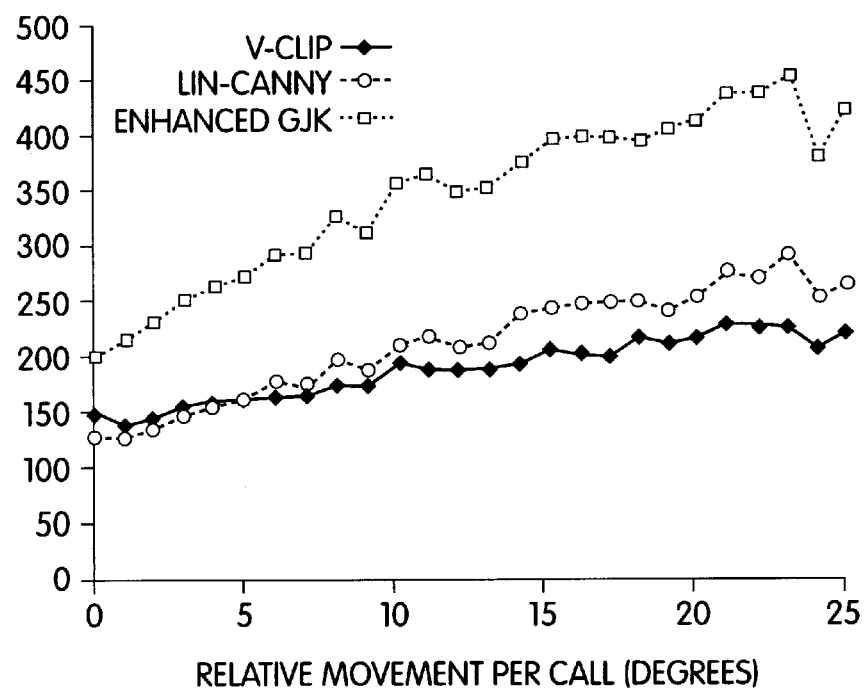
Figure 10C:
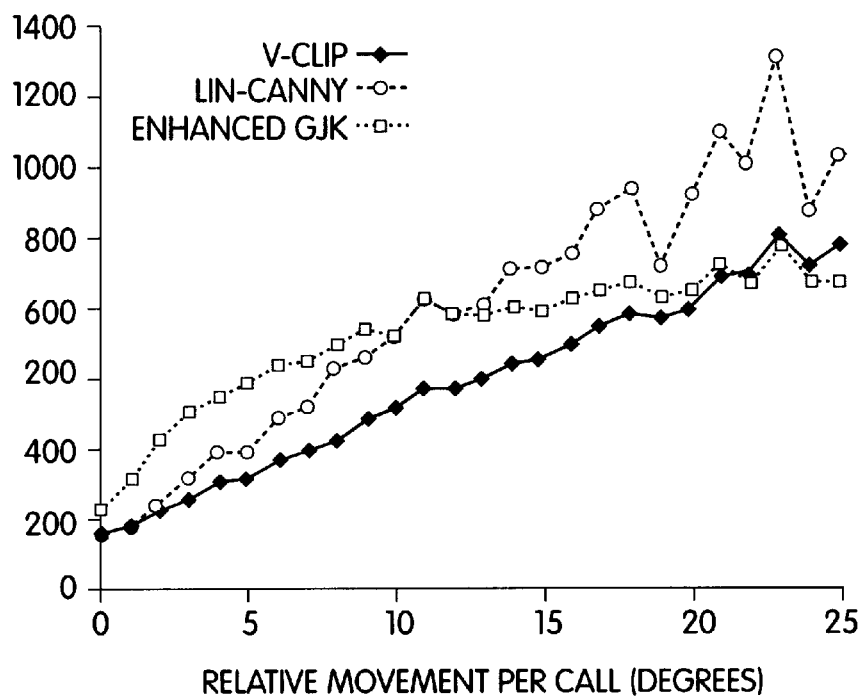
Figure 10D:
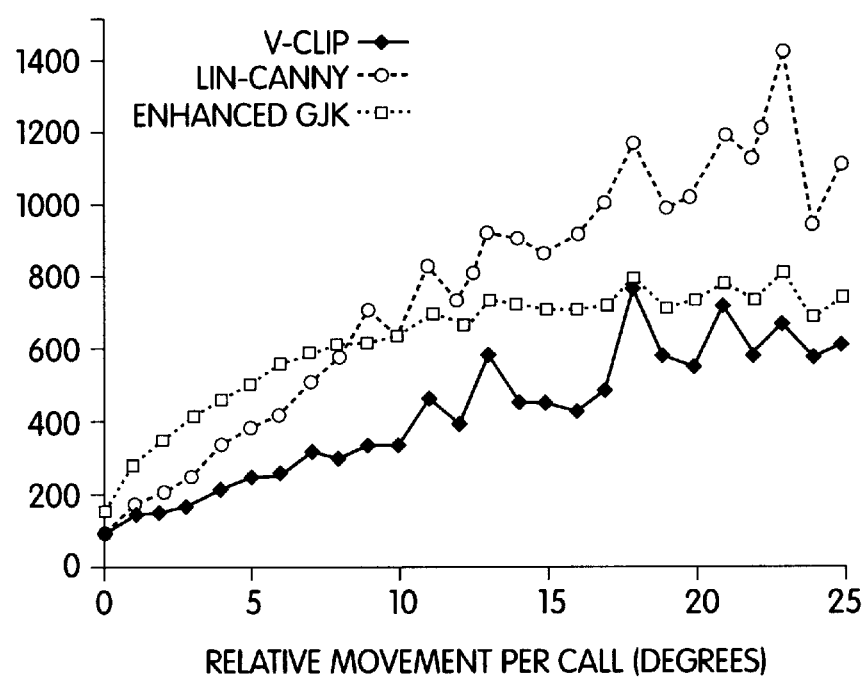

However, during the feature update process, it is possible to get lodged in a local minimum in the vertex-face state, which may be caused by penetration. This happens when the vertex satisfies the face-edge plane constraints of the Voronoi region of the face, lies "below" the plane of F, and has neighboring edges that are all directed away from F. In this situation, any update to a neighboring feature would either increase the inter-feature distance, or increase the dimension of a feature while keeping the inter-feature distance constant. Neither of these are valid updates. When the algorithm reaches such a state, the polyhedra may or may not be penetrating, depending upon other features of the polyhedron. If they are penetrating, the algorithm should terminate and report this. If not, a new pair of features must be found that escape the local minimum. FIG. 9 illustrates the procedure for determining whether there is penetration or a local minimum. The vertex V is tested against each face plane of polyhedron including the face F. If V lies on the negative side of all of them (step 735), it is inside the polyhedron and a penetration flag is returned (step 740). Otherwise, the face that has the maximum signed distance from V becomes the new feature. If the face is updated, then V is at least as close to the new face as to any other face on F's polyhedron, and is strictly closer to the new face than to the original face F. Hence, there is no possibility of descent back into the same local minimum between V and F. The present invention detects penetration in one of two states: in the edge-face state (step 509), when the edge pierces the face; and in the vertex-face state (step 740), when a vertex lies inside of the other polyhedron. When polyhedra penetrate a small amount relative to their sizes, the witness pair will be edge-face. Only if a polyhedron moves almost completely through another one might vertex-face penetration witnesses occur.

The processes of the present invention are independent of the representations of the polyhedra and of the Voronoi regions. The system must simply be able to determine the relevant Voronoi planes. Also, the system merely determines closest features. Those features may be used in a variety of manners for display or control of the represented objects. Since the present invention can be used with moving objects, the determination of the closest features will be repeated at different iterations in the movement of the objects. Coherence is exploited by caching the pair of closest features from one invocation of the process to the next. This expedites the process for updating features upon movement. The method of initializing the feature pair is not critical, since the algorithm converges to a pair of closest features from any starting pair. Similarly, the data representing the Voronoi planes and regions for each feature can be stored. In this manner, if the movement of the objects are represented as transformations from an current position to at new position, the Voronoi planes and regions can also be easily determined using the same transformations.

The processes of the present invention have been compared to prior art systems to determine relative speeds. Comparing speeds of different collision detection algorithms is difficult, and the literature is not without contradictory claims. The speeds of the algorithms depend heavily on many factors that are not constant among the results reported: the particular problem instances: how the objects are shaped, how they are moving, how they are clustered; Implementation issues: language, compiler, optimizer, floating-point number format, amount of inlined code and hand-coded assembly instructions, etc.

The first set of tests were designed to measure performance on a variety of problems under varying levels of coherence. The task of designing tests was simplified since none of the tested algorithms are meant to be complete collision detection packages that handle thousands of objects, such as I-Collide, but rather the lowest level collision detection routines in such systems. Thus, it suffices to test the algorithms on systems involving only two objects. In each test, Object 1 was held fixed at the origin while Object 2, identical in shape, followed a continuous course through space around it. The three coordinates of Object 2's center varied sinusoidally, as it also rotated around an axis. The tests were performed with four different types of objects. An ordinary cube was chosen as the first test shape, since bounding boxes are common in collision detection applications. A regular icosahedron (20 triangular faces) was chosen as a medium complexity model. A polygonized disk was chosen as the third test shape. The aspect ratio of disk radius to thickness was 10:1. A distinguishing feature of this test shape is that it contains high complexity faces: two of the faces are 60-sided polygons. Finally, a tesselated sphere with 642 vertices, 1920 edges, and 1280 triangular faces was chosen as a high overall complexity model. Each algorithm was run on an identical set of problem instances.

Floating-point operation counts were used as the benchmark of computational speed. Floating-point operations are the dominant cost in all of the algorithms, and are independent of language, compiler, and optimizer. Additions (including subtractions and comparisons) were the most common floating-point operation, followed by multiplications. In all of the algorithms, the proportions of these two categories were roughly the same, and together they accounted for at least 98% of the floating-point operations. The results of the testing, respectively for the cube, icosahedron, sphere, and disk objects, are illustrated in FIGS. 10a–10d. For the Lin-Canny and the present invention algorithms, the counts reported include the cost of computing the closest points since these algorithms cannot compute the distance without them. Enhanced GJK can, however, and in the tests it was not asked to provide the closest points. The tests show excellent performance by the present invention relative to known systems.

The above tests also afforded the opportunity to gather data on algorithm accuracy. The distances reported by the three algorithms after each invocation were checked for consistency. Each algorithm's result was compared to the minimum result returned by any of the three algorithms; a warning was flagged if the difference exceeded a predefined tolerance of $10^{-6}$. The present invention had the best performance, generating no warnings over the one million invocations. Enhanced GJK was nearly perfect, generating only 11 warnings, with a maximum distance deviation of $1.6 \times 10^{-4}$. These warnings all disappeared when the main numerical tolerance in the implementation was lowered from $10^{-5}$ to $10^{-7}$ Lin-Canny performed the worst, generating 208 warnings, with distance deviations as large as $10^{-2}$. Several attempts at tweaking the Lin-Canny numerical tolerances reduced the warning count to 88.

A second test probed the algorithms' robustness in degenerate situations. Each of this test's 100,000 trials involved searching for a boundary case while performing collision detection between two cubes. The first object was kept at the origin, while the second object's pose was interpolated between two poses chosen randomly from a distribution that favored near parallel edges and faces. The coherence devices returned by the algorithms are saved; these are pairs of closest features in the case of the present invention and Lin-Canny, and pairs of simplices in the case of EGJK. A binary search method was used to home in on poses were these features or simplices changed. Such boundary cases are the most likely places for anomalous behavior.

This test quickly exposed the degeneracy problems of Lin-Canny. With the numerical tolerances set as they had been for minimizing the warning messages in the previous experiments, cycling behavior was observed in 4489 of the trials. Tweaking the tolerances lowered this number to 37, but significantly reduced the accuracy of the reported distances, and caused Lin-Canny to return very erroneous distances in 22 trials. Enhanced GJK never exhibited any cycling or erroneous distances with its main tolerance set to $10^{-7}$. However, with the tolerance set to $10^{-8}$, Enhanced GJK reported a zero distance (penetration) in 175 of the trials, even though the actual distance between the cubes was never below $4-2\sqrt{3}$. The present invention, with no tolerances to tune, did not exhibit any cycling, nor did it report a detectably incorrect distance.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A system for determining closest features between two objects wherein each of the objects are represented as a set of features defining a polyhedron, the system comprising:

feature selection means for selecting a first feature from a first polyhedron and a second feature from a second polyhedron;

Voronoi region determining means for determining a first Voronoi region corresponding to said first feature and a second Voronoi region corresponding to said second feature;

first means for comparing said first feature to said second Voronoi region to determine whether a first closest point of said first feature is within said second Voronoi region;

second means for comparing said second feature to said first Voronoi region to determine whether a second closest point of said second features is within said first Voronoi region;

selection means for selecting said first and second features as said closest features when said first feature is in said second Voronoi region and said second feature is in said first Voronoi region;

selecting means for selecting a new first feature and a new second feature based upon a position of said first feature relative to said second Voronoi region and a position of said second feature relative to said first Voronoi region when said first feature is outside said second Voronoi regions or said second feature is outside said first Voronoi region; and wherein the first and second means for comparing further comprise:

means for clipping an edge type feature with a Voronoi region of another feature to determine an entry point where said edge enters said Voronoi region and an exit point where said edge exits said Voronoi region;

means for determining a sign of a derivative of a function representing a distance between said edge type feature and said other feature at said entry point as an entry sign and at said exit point as an exit sign;

means for determining an entry feature defining a plane of said Voronoi region corresponding to said entry point, and an exit feature defining a plane of said Voronoi region corresponding to said exit point; and wherein said means for selecting includes edge means for selecting said new first feature and said new second feature based upon said entry sign, exit sign, entry feature and exit feature when said first feature or said second feature is an edge type feature.

2. The system of claim 1, wherein said first and second means for determining include state machines identifying processes for determining relationships between features, wherein the states of the state machines are based upon a type of the first feature and a type of the second feature.

3. The system of claim 1, wherein said means for selecting includes:

means for comparing one of said first feature and said second feature to each of a plurality of planes defining a respective one of said first Voronoi region and said second Voronoi region;

means for determining violation of at least one of the plurality of planes by said one of said first feature and said second feature;

means for determining a relative position of one of said first closest point and said second closest point corresponding to said one of said first feature and said second feature to the at least one of the plurality of planes which was violated; and means for selecting a feature defining said at least one of the plurality of planes which was violated based upon the relative position of said one of said first closest point and said second closest point.

4. The system of claim 3, wherein when said first feature and said second feature are each edge type features, said means for determining violation determines violations of vertex planes of the corresponding Voronoi region before determining violations of face planes of the corresponding Voronoi region.

5. The system of claim 1, further comprising means for determining whether said first object and said second object are penetrating when at least one of said first closest point is not within said second Voronoi region and said second closest point is not within said first Voronoi region.

6. The system of claim 1, further comprising control means for selecting pairs of objects from said at least two objects and for controlling operation of said feature selection means, Voronoi region determining means, first means, second means, and selection means such that one of a new first feature and a new second feature is selected until closest features are determined between each pair of objects.

7. The system of claim 6, further comprising means for displaying the at least two objects and closest features on said at least two objects.

8. The system of claim 6, further comprising means for outputting closest features between said at least two objects and distances between said closest features.

9. The system of claim 6, further comprising means for moving said objects; and wherein said control means operates to determine closest features between each pair of objects after each movement of said objects.

10. The system of claim 9, further comprising:

means for storing Voronoi regions determined by said Voronoi region determining means, and means for adjusting said stored Voronoi regions based upon movement of corresponding objects.

11. The system of claim 9, further comprising:

storage means for storing closest features between each pair of objects; and wherein, after movement of said objects, said feature selection means selects as said first feature and said second feature respective closest features stored in said storage means.

12. A method for determining closest features between at least two objects wherein each of the objects are represented as a set of features defining a polyhedron, the method comprising the steps of:

(a) selecting a first feature from a first polyhedron and a second feature from a second polyhedron;

(b) determining a first Voronoi region corresponding to said first feature and a second Voronoi region corresponding to said second feature;

(c) comparing said second Voronoi region to said first feature, and said second Voronoi region to said first feature, and said second Voronoi region to said second feature;

(d) selecting a new first feature and a new second feature based upon a position of a first point on said first feature closest to said second feature relative to said second Voronoi region, and a position of a second point on said second feature closest to said first feature relative to said first Voronoi region when said first feature is outside said second Voronoi regions or said second feature is outside said first Voronoi region; and (e) repeating steps (b)–(d) until said first point is within said second Voronoi region and said second point is in said first Voronoi region and wherein step (c) further comprises the steps of:

clipping an edge type feature with a Voronoi region of another feature to determine an entry point where said edge enters said Voronoi region and an exit point where said edge exits said Voronoi region;

determining a sign of a derivative of a function representing a distance between said edge type feature and said other feature at said entry point as an entry sign and at said exit point as an exit sign;

determining an entry feature defining a plane of said Voronoi region corresponding to said entry point, and an exit feature defining a plane of said Voronoi region corresponding to said exit point; and wherein step (d) further comprises the step of:

selecting said new first feature and said new second feature based upon said entry sign, exit sign, entry feature and exit feature, when said first feature or said second feature is an edge type feature.

13. The method of claim 12, wherein step (d) includes the steps of:

comparing one of said first feature and said second feature to each of a plurality of planes defining a respective one of said first Voronoi region and said second Voronoi region; and selecting a feature, as said new first feature or said new second feature, which defines one of the plurality of planes which is violated by one of said first point and said second point.

14. The system of claim 12, wherein when said first feature and said second feature are each edge type features, said comparing step includes the steps of:

comparing a feature to vertex planes of the corresponding Voronoi region; and comparing said feature to face planes of the corresponding Voronoi region after comparing the feature to the vertex planes.

15. The method of claim 12, wherein said at least two objects includes at least three objects, said method further comprising:

before step (a), the step of selecting a pair of objects from the at least three objects; and after step (e), the step of repeating steps (a)–(e) for each pair of objects from the at least three objects.

16. The method of claim 12, further comprising the steps of:

changing one of a position and orientation of at least one of said objects; and repeating steps (a)–(e) to determine new closest features of the objects after movement.

17. A method for determining a distance between a first polyhedron and a second polyhedron, each of the polyhedrons having features, the features including vertices, edges and faces, each feature having associated Voronoi regions, comprising the steps of:

selecting a first feature of the first polyhedron and a second feature of the second polyhedron; and clipping the first feature by the Voronoi region of the second feature if the first feature is an edge feature;

clipping the second feature by the Voronoi region of the first feature if the second feature is an edge feature; and determining whether a distance function of the clipped edge feature includes a minimum, if true, selecting the clipped edge feature as a potential closest feature, and if false, selecting a new feature and repeating the clipping and determining steps.

18. The method of claim 17 further comprises the steps of:

determining derivatives of the distance function at an exit point an entry point of the clipped edge feature.

19. The method of claim 18 further comprising the steps of:

selecting the new feature to be adjacent to the exit point if the derivative at the exit point is less than zero;

selecting the new feature to be adjacent to the entry point if the derivative at the entry point is less than zero; and selecting the clipped feature as the potential closest feature if the derivative at the exit point is less than or equal to zero, and the derivative at the entry point is greater or equal to zero.

20. The method of claim 17 further comprising the steps of:

selecting the first and second feature as the closest features of the first and second polyhedron if the distance function of the first and second features both include minimums.

21. The method of claim 17 further comprising the steps of:

selecting the first and second feature as the closest features of the first and second polyhedron if the first feature is a vertex feature in the Voronoi region of the second feature, and if the second feature is a vertex feature in the Voronoi region of the first feature.

22. The method of claims 20 or 21 further comprising the steps of:

determining a distance between the closest features.

23. The method of claim 17 wherein the first and second polyhedrons are colliding when a distance between two closest points is zero.

24. The method of claim 17 wherein the first and second polyhedrons are penetrating when a distance between two closest points is negative.

25. The method of claim 17 further comprising the steps of:

comparing adjacent edge features of a vertex feature to the Voronoi region of a face feature to determine whether the vertex feature is the potential closest feature.

26. The method of claim 25 wherein the comparing further comprises the step of;

taking a dot product of each adjacent edge feature and the face feature.

* * * * *